No. 872,830. PATENTED DEC. 3, 1907.
N. H. O. LILIENBERG.
APPARATUS FOR COMPRESSING STEEL INGOTS.
APPLICATION FILED DEC. 11, 1906.
6 SHEETS—SHEET 1.
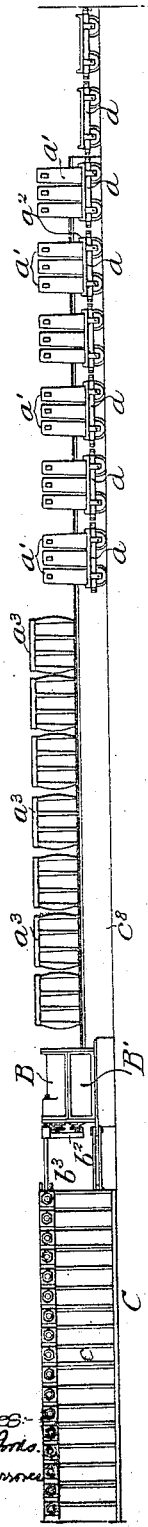
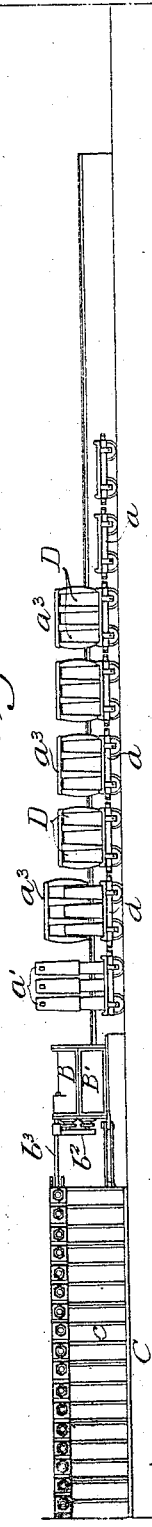
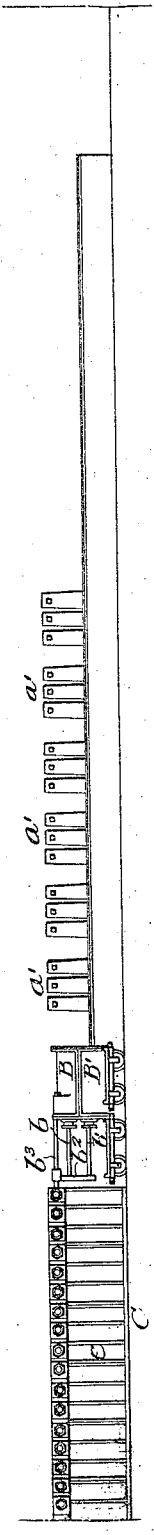
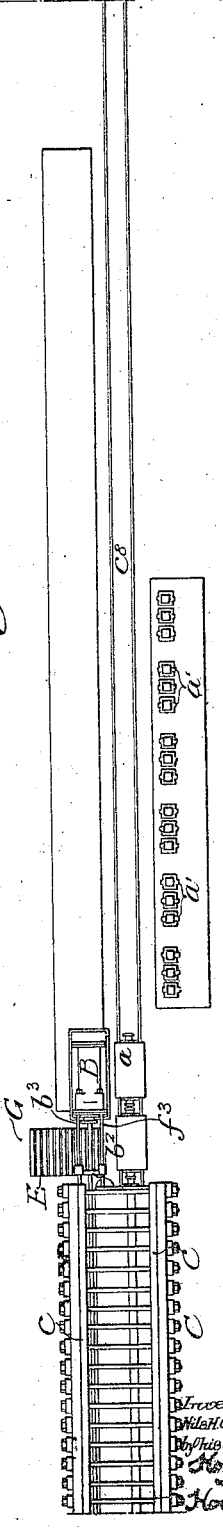

No. 872,830. PATENTED DEC. 3, 1907.
N. H. O. LILIENBERG.
APPARATUS FOR COMPRESSING STEEL INGOTS.
APPLICATION FILED DEC. 11, 1906.
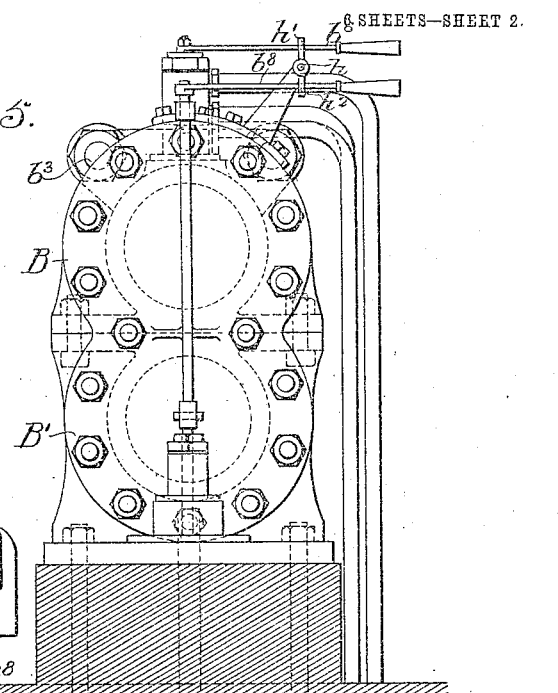
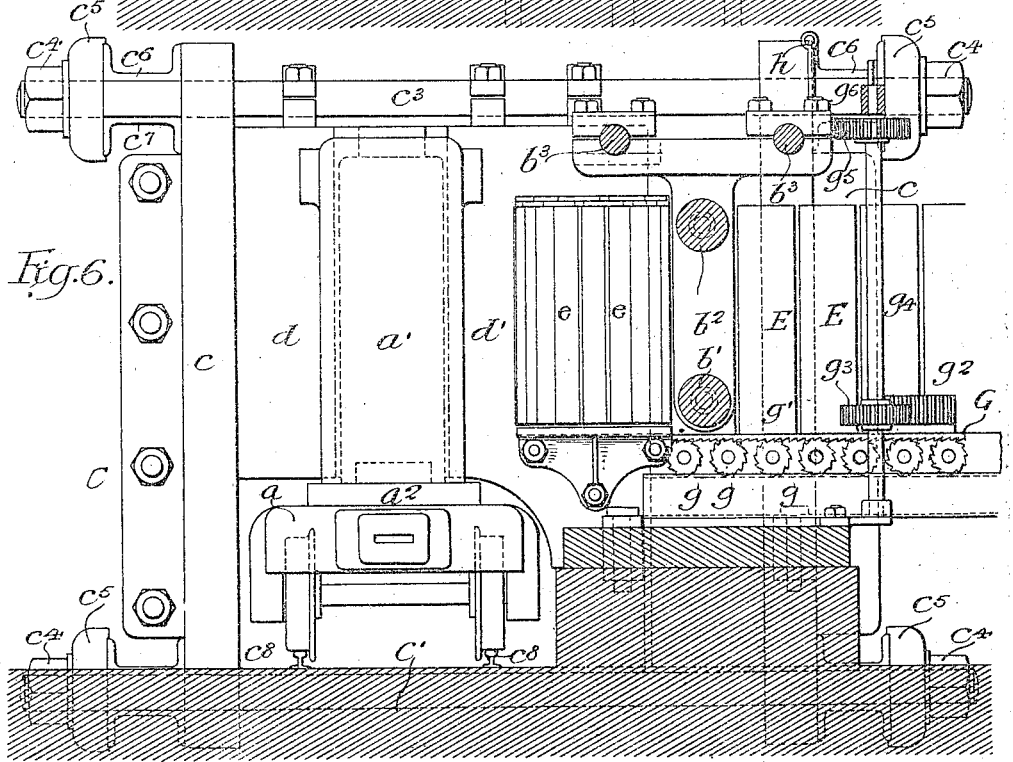

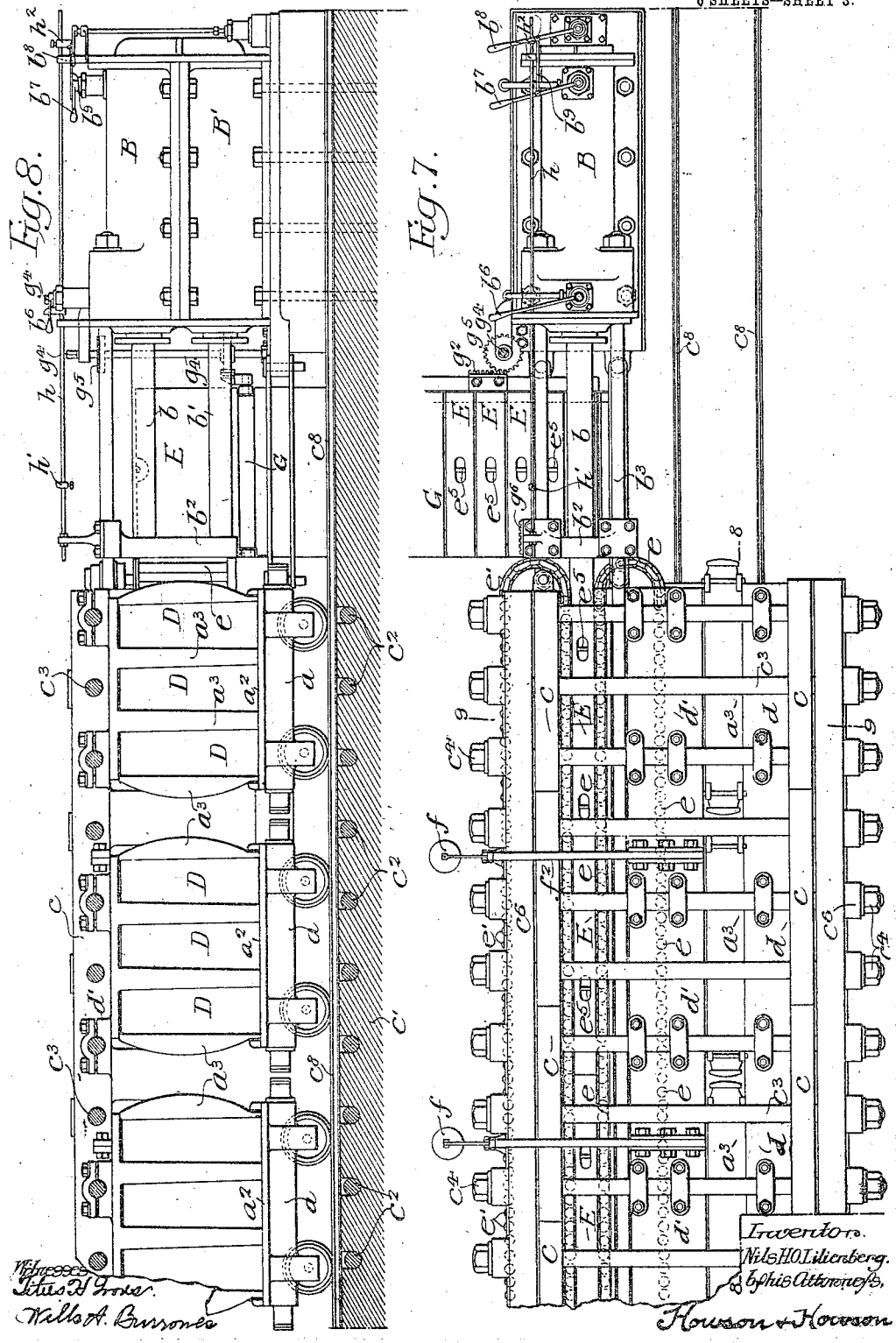

No. 872,830. PATENTED DEC. 3, 1907.
N. H. O. LILIENBERG.
APPARATUS FOR COMPRESSING STEEL INGOTS.
APPLICATION FILED DEC. 11, 1906.

6 SHEETS—SHEET 4.

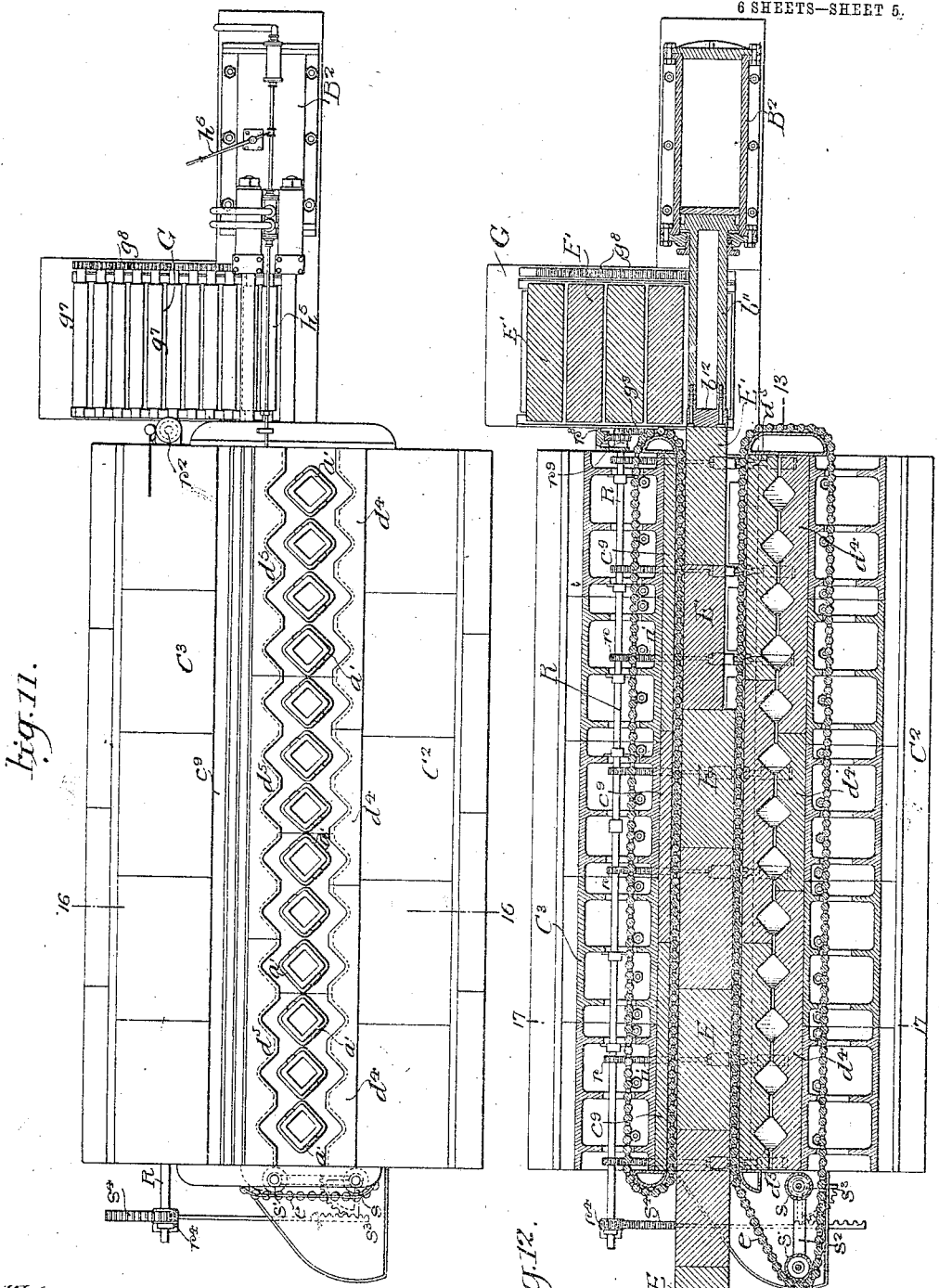

No. 872,830. PATENTED DEC. 3, 1907.
N. H. O. LILIENBERG.
APPARATUS FOR COMPRESSING STEEL INGOTS.
APPLICATION FILED DEC. 11, 1906.
6 SHEETS—SHEET 6.
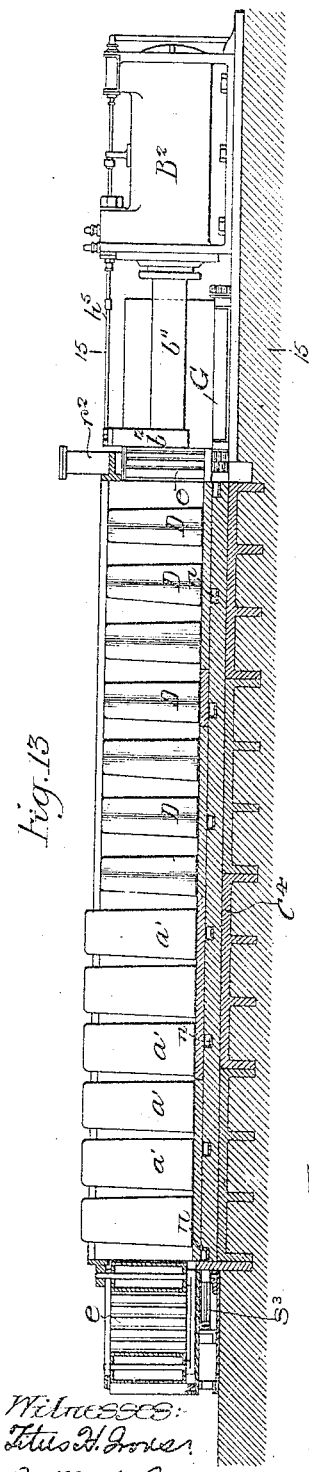
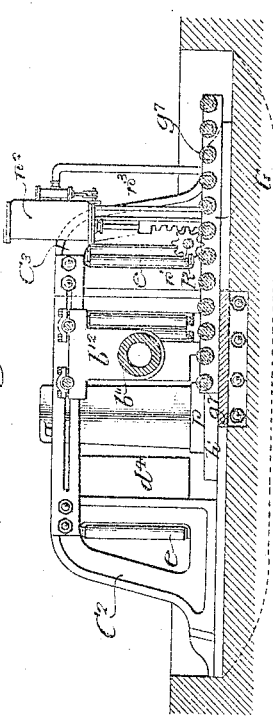
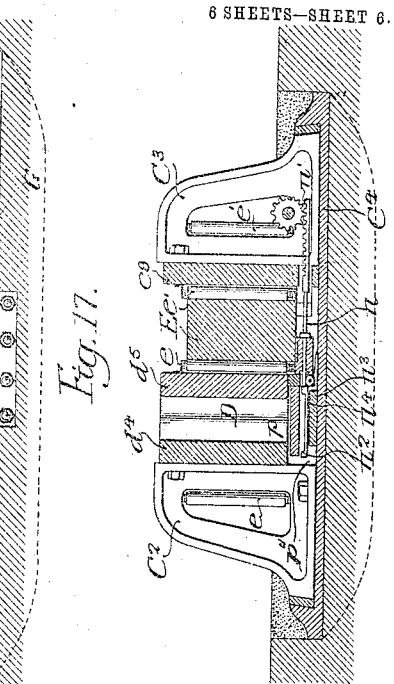
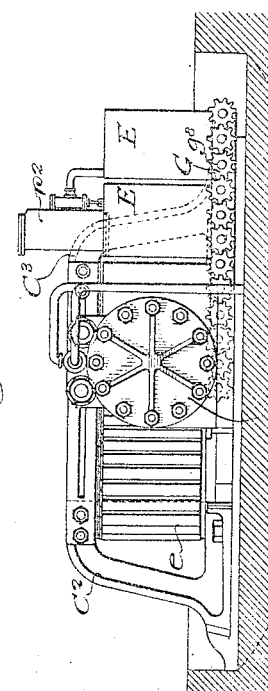
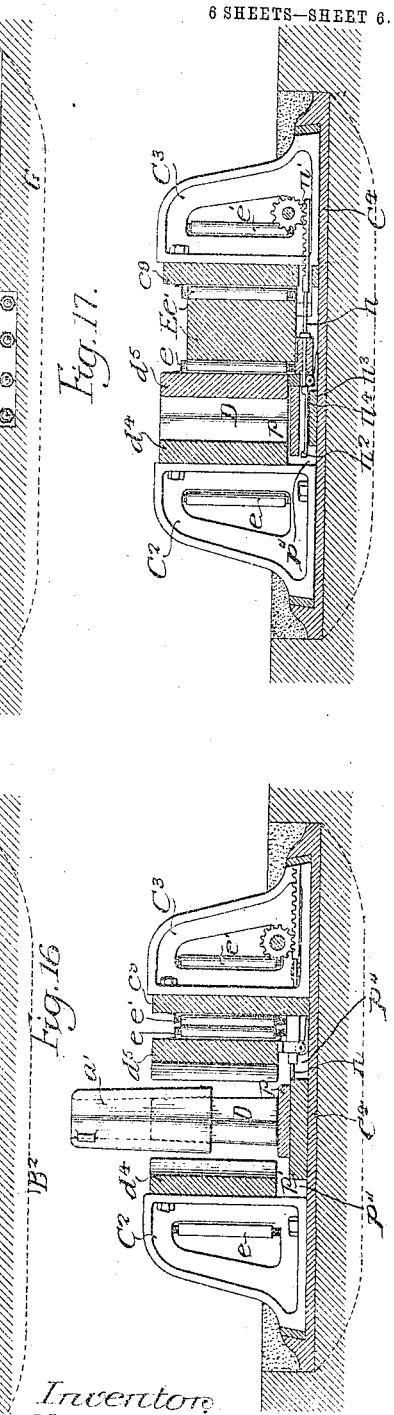
Witnesses:
Titus H. Grover
Walls A. Burrowes
Inventor
Nils H. O. Lilienberg.
by his Attorneys,
Howson & Howson

UNITED STATES PATENT OFFICE.

NILS H. O. LILIENBERG, OF PHILADELPHIA, PENNSYLVANIA.

APPARATUS FOR COMPRESSING STEEL INGOTS.

No. 872,830.          Specification of Letters Patent.          Patented Dec. 3, 1907.

Application filed December 11, 1906. Serial No. 347,331.

*To all whom it may concern:*

Be it known that I, NILS H. O. LILIENBERG, a subject of the King of Sweden, residing in Philadelphia, Pennsylvania, have invented certain Improvements in Apparatus for Compressing Steel Ingots, of which the following is a specification.

One object of my invention is to provide apparatus for simultaneously compressing a number of ingots, as soon as they have solidified to an extent sufficient to permit of the stripping of the molds, in order to reduce the segregation and secure a finished product which shall be free from pipe and sound throughout its mass.

Another object of the invention is to provide a machine for producing ingots, as above indicated, which shall be of such a nature as to require for its operation but a relatively small amount of hand labor and shall at the same time be of high efficiency of action.

It is further desired to provide a machine for carrying out the operation of compressing the ingots, which shall be of relatively simple construction and of such a nature as to require but little attention or repair.

These objects I attain as hereinafter set forth, reference being had to the accompanying drawings, in which:—

Figure 9:
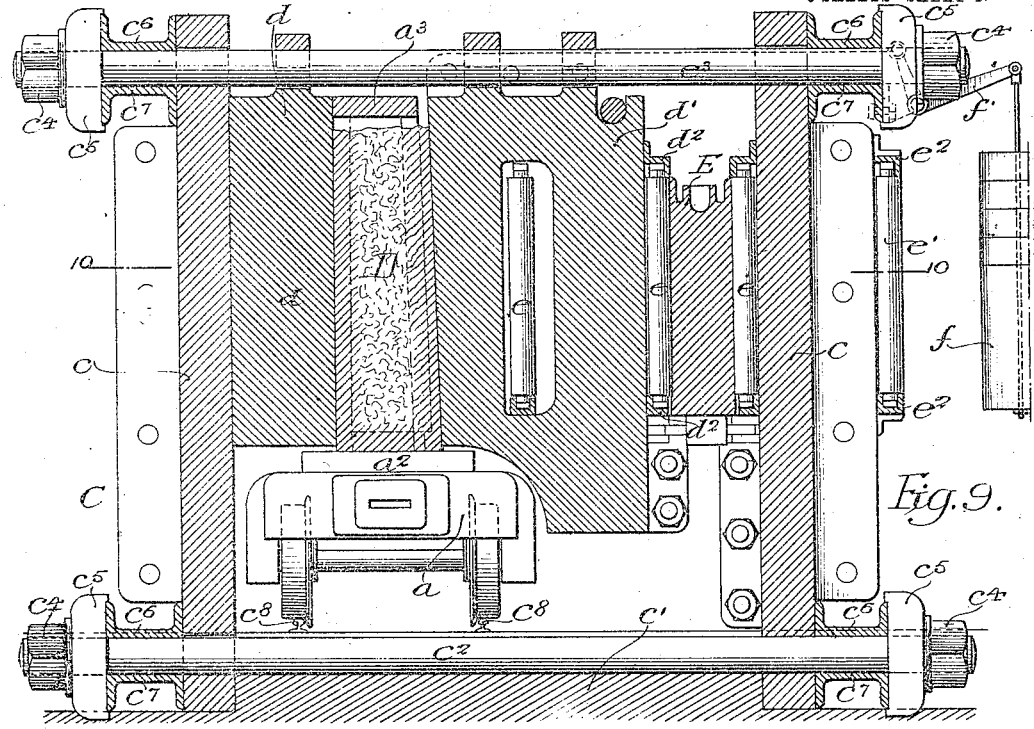
Figure 10:
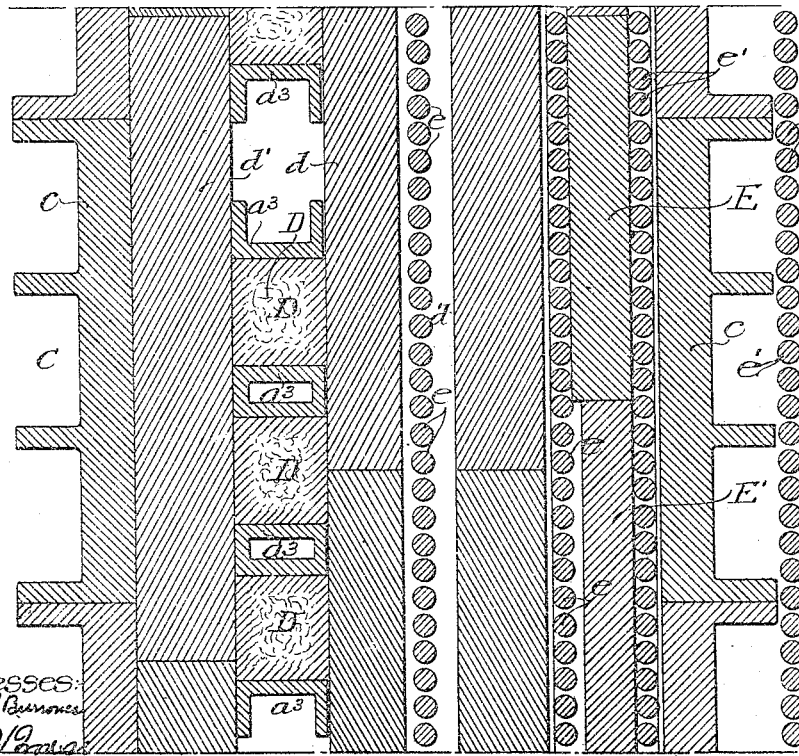

Figures 1, 2 and 3, are side elevations illustrating on a small scale the apparatus comprising my invention; Fig. 4, is a plan view of the apparatus showing its parts in the same relative positions as are illustrated in Fig. 3; Fig. 5, is a rear end elevation of the hydraulic cylinders and certain of their controlling mechanism employed in carrying out my invention; Fig. 6, is a section of the press, showing also in elevation one of the cars and an ingot mold thereon; Fig. 7, is a plan view of the hydraulic cylinders and a portion of the press, illustrating the means for automatically feeding the wedges into position; Fig. 8, is a side elevation of the hydraulic cylinders, and a vertical section of the press taken on the line 8—8, Fig. 7; Fig. 9, is a transverse vertical section of the press on a scale somewhat larger than that of Fig. 7, the same being taken on the line 9—9 of said figure; Fig. 10, is a horizontal section taken on the line 10—10, Fig. 9; Fig. 11, is a plan of a modified form of my invention, particularly designed for compressing ingots while they stand in a casting pit; this figure illustrating the various parts in positions occupied by them during casting; Fig. 12, is a horizontal section of the apparatus shown in Fig. 11, illustrating the various parts in the positions occupied during the operation of compressing the ingots; Fig. 13, is a vertical section on the line 13—13, Fig. 12; Fig. 14, is an end elevation of the machine shown in Fig. 11; Fig. 15, is a vertical section on the line 15—15; Fig. 13; Fig. 16, is a transverse vertical section on the line 16—16, Fig. 11, illustrating the positions occupied by the various parts while the molds are being stripped from the ingots, and Fig. 17, is a transverse vertical section taken on the line 17—17, Fig. 12.

Referring to Figs. 1 to 4 inclusive, of the above drawings, $a$—$a$ are the cars of a train designed to each carry a series of ingot molds $a'$ (there being in the present instance three to a series) and upon which said molds rest during the operation of casting the ingots. Each car carries a single bottom piece $a^2$ upwardly flanged at its ends, designed to form the bottoms of the ingot molds upon it, as well as to confine between its flanges the lower ends of a frame $a^3$. These frames of cast iron are each constructed to fit over the tops and between the ingots carried on one car, and to confine them at the ends and top while leaving them open at the sides. The width of the frames, while it may be varied to suit any case, is, as shown in Figs. 9 and 10, about three inches less than that of the ingots. The object of the frames is to maintain the ingots in their proper vertical positions while they are standing upon the cars after the molds have been stripped from them and are also designed to confine the ingots during their compression as hereafter described.

B and B′ are a pair of hydraulic cylinders, having piston rods $b$ and $b'$ respectively connected to each other by cross heads $b^2$, designed to be supported and guided by a pair of rods on guides $b^3$.

C represents the press, which, as shown best in Figs. 6, 9 and 10, consists of a pair of vertically extending walls $c$ supported upon a suitable bed or foundation $c'$, preferably made of heavy castings provided with vertical ribs, as shown in Fig. 10. These two wall structures extend for a length sufficient to receive between them the entire train of cars $a$, with the exception of two extra end cars, which are employed for the purpose of permitting the locomotive remaining at a proper distance from the press. Said walls are held together and prevented from spreading under pressure by means of heavy bolts, of which one series $c^2$ extends between the lower portions of the walls and the series $c^3$ extends between the upper portions thereof. Each of the bolts is threaded at both ends and provided with nuts $c^4$ and heads $c^5$; the latter serving to confine and hold in position pairs of channels $c^6$ and $c^7$ at each of the four corners thereof.

Suitably suspended from the upper series of bolts $c^3$ are two series of elongated blocks $d$ and $d'$; the first of these being hung so as to be adjacent to one of the walls $c$ and the other being supported so as to be at such a distance from the blocks $d$ as will permit of an ingot being entered between them.

Upon the base or foundation $c'$ and suitably placed relatively to the two series of blocks $d$ and $d'$ are car tracks $c^8$ for the reception of the cars $a$, and it will be seen that the second series of blocks $d'$ may be moved toward or from the ingots D upon the rods or bolts $c^3$. For the purpose of forcing these blocks towards the ingots to compress the latter, I provide a series of wedge-shaped blocks E designed to be forced between one of the walls $c$ and the series of blocks $d'$ and in order to prevent undue friction between the adjacent surfaces of these parts, I provide two series of steel rollers $e$ and $e'$. The rollers of one series are carried by a pair of link chains which run in or are guided by channels or other rolled sections $d^2$ supported on one face of the blocks $d'$, and extend through a suitable cavity formed longitudinally in said blocks; these rollers being guided around the ends of the blocks, as shown in Fig. 7. The second series of rollers $e'$ is similarly supported on the inside face of the wall $c$ adjacent to the blocks $d'$ and, extending around the ends of said wall structure, returns in suitable guideways $e^3$ supported on the outside of said wall. For moving the blocks $d'$ away from the ingots after these have been compressed, I provide a series of weights $f$ hung from the long arms of suitably supported levers $f'$. The short arms of these levers are connected by rods $f^2$ to the upper portions of the blocks $d'$, so that as soon as the force tending to move said blocks towards the ingots is removed, said weights become effective to draw them back.

Between the hydraulic cylinders and the end of the press, I provide a platform G movable transversely of the line of movement of the piston rods $b$ and $b'$; designing this for the support of the wedge blocks E previous to their entrance into the press. This platform is of the endless variety and is constructed to be periodically moved so as to deliver the wedges in front of the cross head $b^2$ attached to the piston rods. For the purpose of causing said operation, I provide said platform with a series of driving wheels $g$ having ratchet teeth, and for moving said wheels I employ a rack $g'$ whose teeth point in such a direction that when it is moved toward the piston rods $b$ and $b'$, it will cause revolution of the wheels $g$, while when it is moved in the opposite direction it will slip over the teeth of said wheels without moving them.

Rigidly attached to and parallel with the rack $g'$ is a second rack $g^2$ designed to be engaged by a gear $g^3$ carried on a vertical shaft $g^4$, while a second gear $g^5$ carried on the upper end of this shaft, is designed to mesh with a rack $g^6$ fastened to one side of the upper part of the cross head $b^2$, as shown in Fig. 7. As a result of this construction, just before the cross head reaches the inner end of its stroke this latter rack will give a partial revolution to the gear $g^5$ and hence to the gear $g^3$, thereby moving the platform G a predetermined distance toward the plane of movement of the piston rods.

While the admission and exhaust of motive fluid for actuating the piston of the two hydraulic cylinders may be controlled by hand through the agency of the levers $b^6$, $b^7$ and $b^8$, I may cause such control to be automatic by the use of a rod $h$ carrying a pair of adjustable stops $h'$ and $h^2$ and connected to the cross head $b^2$ so as to be moved longitudinally thereby. For this purpose the two levers $b^7$ and $b^8$ are connected by a link $b^9$ so as to be caused to move together when engaged by the stop $h^2$, and similarly the lever $b^6$ may be moved by the stop $h'$.

In operating my improved apparatus a charge of molten steel is cast in the various molds $a'$ carried on the cars $a$, and as soon thereafter as the metal has cooled sufficiently, said molds are stripped from the ingots. The frames $a^3$, which have been supported on a suitable platform adjacent to the tracks $c^8$, are placed respectively over each set of three ingots; it being noted that the construction of said frames is such as to permit of their being moved sidewise into position, as shown in Fig. 2. The train is now moved so that all of its cars upon which ingots are carried are within the press and the series of wedges E on the platform G are successively forced by the hydraulic apparatus between the walls $c$ and the series of movable blocks $d'$.

As will be understood by those skilled in the art, those ingots first cast will have cooled to a greater degree than those cast at a later time and in view of this fact I so proportion the wedges and so arrange the speed of their passage through the press that the ingots will be compressed to such an extent that the formation of pipe within them is rendered impossible by reason of the fact that the pressure follows up, as it were, the contraction of the metal as the still liquid interior of each ingot becomes solid. With this idea in view the compression during the time of solidification of the steel is maintained to such an extent that the ingot may be described as at all times full to the top; there being thus no possibility of the formation of cavities.

I have found that for the treatment of ingots 60 in. high and 18 in. square, weighing about 2½ tons, wedge blocks 6 ft. in length and 3 ft. 9 in. high may be employed; the taper of the wedges being such that the first cast ingot should be only half compressed when the last ingot at the other end of the machine is beginning to be compressed. Assuming that 20 wedges are to be used and that one-half of these shall be in the press at one time, I have found it desirable to compress the ingots so as to reduce their width 3 in. The taper for ten wedge blocks would therefore be an inch and a half, that is to say, about one-eighth inch for each block. In addition, the taper should be somewhat greater in the first blocks than in the last ones passing through the machine, for the reason that the ingots cool more rapidly at first than they do just before the last liquid in them becomes solid. Of the twenty wedge blocks, I preferably make the first of a thickness of 12 in. at one end and 12⅛ in. at the other end, while the last block is 14⅞ in. at one end and 15 in. at the other. Said blocks are preferably of planed steel, though, if desired, they may be made from chilled cast iron.

In order to insure a smooth and hard bearing surface for the roller bearings $e$ and $e'$, these should preferably roll over steel plates fixed to the walls $c$ or movable blocks $d'$ as the case may be. The last of the wedge blocks is pushed through the machine by means of a proper number of relatively narrow parallel-sided blocks $E'$, as shown in Fig. 10, and these may be 12 in. wide so as to leave a clearance space of an inch and a half on each side. It will be seen that as soon as the last of the wedges E is replaced by the blocks $E'$, the weights $f$ act to automatically draw the movable blocks $d'$ toward the wall $c$, thereby freeing the ingots and making it possible to withdraw the cars upon which these are carried.

While it is possible to use permanently headed bolts instead of the nut and washer construction shown in Fig. 9, this latter form is more desirable for the reason that in case of accidental sticking of the wedges, the machine can be relieved by backing off the nuts on the bolts $c^2$ and $c^3$. It will be understood that the wedges are placed upon the platform G preparatory to their insertion in the machine and are forced one by one from said platform between the two series of rollers $e$ and $e'$ by the cross head $b^2$. After having made an outward stroke, the rack $g^3$ on the cross head causes a partial turn to the shaft $g^4$ as the cross head is moved toward the cylinders B and B', thereby moving the platform G to such an extent that another wedge is brought in line with said cross head. As this latter moves out at the beginning of another stroke, the rack again causes a partial revolution of the said shaft, but in the opposite direction to that above noted, and because of the inclination given to the teeth of the rack $g'$ and ratchet wheels $g$, this does not cause moving of said platform, since said rack merely slips over said wheels.

As previously noted, the operation of the hydraulic cylinders may be controlled automatically through the agency of the rod $h$ and the stops $h'$ and $h^2$ thereon, or by hand through the levers $b^6$, $b^7$ and $b^8$.

The time occupied by the above described series of operations will be, under working conditions, as follows:—The pouring of the steel into the mold will take about seventeen minutes, and if three of the ingots were stripped at one time, this would occupy about six minutes. The placing of the frames around the stripped ingots would probably take six minutes, and it is possible that from one to two minutes would be consumed in moving the train into position in the press. After the frames had been placed, the compression would occupy about forty-five minutes for ingots of the size noted above.

As the wedges are discharged from the machine any desired means may be employed for returning them to the platform G, such—for example—as the crane used in moving the molds and frame, or, if desired, some form of conveyer may be used, which, as it forms no part of the present invention, has not been illustrated. It will be noted, however, that the wedges shown are provided with recesses having cross bars $e^5$ to facilitate their transportation by means of a crane.

When it is desired to cast the ingots in a casting pit and to compress them in said pit, I modify the construction of certain of the parts of my invention, as illustrated in Figs. 11 to 17 inclusive. In such case, I provide an elongated structure supported on suitable foundations; this consisting, in the present instance, of two longitudinally extending housings $C^2$ and $C^3$ made in a number of sections, as illustrated, and securely bolted to a supporting base $C^4$ so as to form what is in effect the bottom and two parallel sides of an elongated casting pit.

Bolted or otherwise permanently fixed to the housings $C^2$ are a number of mold sections $d^4$, the outer faces of which are provided with a series of vertical recesses each substantially triangular in section and similar in shape to one-half of the ingot to be compressed. To the housings $C^3$ are also permanently fixed a series of flat plates $c^9$ and between these and the mold sections $d^4$ are a second set of mold sections $d^5$, each provided with vertically extending recesses similar and opposite to those in the sections $d^4$; it being noted that the two sets of recesses are so formed that they will act obliquely upon an ingot, preferably when one of its diagonals is substantially parallel to the general line of the machine.

As in the form of my invention previously described, I provide a series of wedge blocks E designed to be forced through the machine by a ram $b^{11}$ actuated by fluid under pressure within a cylinder $B^2$. Two sets of endless roller bearing chains $e$ and $e'$ are provided, as before, to reduce the friction between the wedges and the faces of the parts $d^5$ and $c^9$; provision being made whereby the roller chain $e$ returns through suitable channels within the housing $C^2$, while the chain $e'$ returns through the housing $C^3$. The mold sections $d^5$ are supported upon the base piece $C^4$ in such manner (in the case illustrated, on rollers) as to be easily movable toward and from the sections $d^4$, and in order that there may be no mechanism or other structure to interfere with the casting and stripping operations, I provide a series of rods or bars $n$, each of which has at one end a rack $n'$, while its other end is suitably connected to one of the sections $d^5$. Plates $p$ form the bottoms of the various ingot molds during the casting operation and are supported on fire brick structures $p'$ in such manner as to leave longitudinally extending spaces $p^4$ which serve as gutters for the reception of slag, scale, etc., which gathers under operating conditions. The rods $n$ for moving the mold sections $d^5$ are loosely connected to the bottom plates $p$ so that as the sections $d^5$ are moved toward the mold sections $d^4$, said plates $p$ are likewise moved with their ingots towards said latter sections. On the other hand, as the mold sections $d^5$ are moved in the opposite direction, the plates $p$ are not moved until said sections have first moved a predetermined distance away from the ingots, after which a head $n^2$ on an extension $n^3$ of each rod $n$ engages a lug $n^4$ on each casting plate $p$, thereby pulling it with its ingot away from the mold section $d^4$.

In order to simultaneously move all of the mold sections $d^5$, I provide a shaft R extending longitudinally of the machine through the housing $C^3$ and provide this with a series of pinions or gear wheels $r$ meshing with the respective racks $n'$ of the rods $n$. Adjacent to one end of this shaft I provide a vertically placed hydraulic cylinder $r^2$, having connected to its piston rod a rack $r^3$ whose teeth mesh with a gear wheel $r'$ on the shaft R. It will be understood that as the mold sections $d^5$ approach or recede from the mold sections $d^4$ there is material variation in the amount of slack in the roller bearing chain $e$ extending outside of the machine, and in order to take this up, I provide a pair of guide rollers $s$ and $s'$, of which the latter is carried upon a pair of arms $s^2$ free to swing axially of the guide roller $s$. These arms are of such a length that when the mold sections are in the positions illustrated in Fig. 11, they are compelled by the roller chain $e$, which passes around the rollers $s$ and $s'$, to lie in a plane transverse to the axis of the machine, while when the mold sections are at a minimum distance apart, as shown in Fig. 12, the slack of the chain is completely taken up when said arms lie substantially parallel to the axis of the machine; the roller $s'$ being for this purpose swung outward from its first position. In order that this operation may be properly performed, I fix to one of the arms $s^2$ a toothed segment $s^3$ and turn this by means of a rack rod $s^4$ properly actuated by a pinion $r^4$ upon the shaft R.

For forcing the last half of the wedges through the machine, I provide, as before, a series of parallel sided and relatively narrow blocks E' and in order that the wedges, as well as these blocks, may be automatically fed or delivered to the machine after once they have been placed in a suitable position, I provide a platform G' suitably supporting a series of rollers $g^7$. Each of said rollers has mounted upon a prolongation of its supporting shaft or spindle a pinion $g^8$ and each pinion meshes with those belonging to the rollers next adjacent to it.

In order that all the rollers may be turned in one direction without intermediate gearing, alternate ones of said pinions are fixed to their spindles, while the intervening pinions are loose, and for the purpose of driving these rollers I provide one of them with a pinion $g^9$, actuated from a pinion $r^8$ on the shaft R. Admission of fluid under pressure to the cylinder $B^2$ is controlled by a rod $h^5$ operated either by a hand lever $h^6$ or by a cross head on the ram $b^{11}$.

Under operating conditions, it will be understood that the mold sections $d^5$ are caused by means of the rack rods $n$, the shaft R, and the rack rod $r^3$, to move away from the mold sections $d^4$, the said shaft being actuated from the piston in the cylinder $r^2$ through the mechanism shown. The ingot molds are then placed on their respective bottom plates $p$ between the mold sections $d^4$ and $d^5$ and the steel ingots cast. As before described, the molds are stripped from the ingots after these have cooled to an extent sufficient to render this possible, and fluid under pressure is again supplied to the cylinder $r^2$ so as to move the mold sections $d^5$ towards the sections $d^4$, the bottom plates $p$ with the ingots being also moved over towards the sections $d^4$. In order that this operation of the shaft R by the cylinder $r^2$ may not cause the wedges to be fed from the roller table G', I provide some form of clutch which may be thrown so that the rollers will not be moved when the said mold sections $d^5$ are moved towards the ingots and the sections $d^4$. The revolution of the shaft R in moving these parts into position to compress the ingots swings outwardly the arms $s^2$, thereby taking up all slack of the roller bearing chain $e$ and preventing this from sagging. The clutch $r^6$ is now so operated as to cause the pinion $r^8$ to be driven from the rack rod $r^3$ and the wedges E are then fed between the wall plates $c^9$ and the mold sections $d^5$ in the manner previously described; being followed by the parallel sided narrow blocks E'. After the last of the wedges has been pushed out of the machine, the blocks E', still remaining within the machine, are removed and the mold sections $d^5$ pulled back by causing the shaft R to be turned by power supplied from the cylinder $r^2$.

It will be seen that after the sections $d^5$ have been moved away from the ingots a predetermined distance, their continued movement causes the heads $n^2$ to engage the plates $p$ and thereby move the ingots themselves away from the mold sections $d^4$, after which said ingots are removed.

While that form of my invention illustrated in Figs. 1 to 10 inclusive, employs between the ingots and the wedges a series of block structures $d'$, and when modified, as in Figs. 11 to 17 inclusive, employs mold sections $d^5$ to perform similar functions, it is to be understood that these two structures are broadly the equivalents of each other. I have, therefore, employed in the claims the word "blocks" to refer to these parts and wish it understood that such term covers and includes either the structures $d'$ or mold sections $d^5$ between the wedges and the ingots, regardless of whether these are regular in shape or are recessed.

I claim as my invention:

1. An ingot press consisting of an elongated frame having substantially parallel walls, means for supporting a series of ingots in a substantially straight line between said walls, means for exerting force in a direction substantially parallel to the walls and to the line of ingots, and means for changing the direction of such force to cause it to act in lines substantially at right angles to the line of ingots, substantially as described.

2. An ingot press consisting of an elongated frame having substantially parallel walls, wedges for the press, and means for forcing said wedges through the press to compress ingots placed between the walls, substantially as described.

3. An ingot press consisting of an elongated frame having substantially parallel walls, a series of blocks movably supported between said walls, a series of wedges constructed to act between said blocks and one of the walls, with means for forcing said wedges through the machine to compress a plurality of ingots confined between the movable blocks and the second of the walls, substantially as described.

4. An ingot press consisting of an elongated frame having substantially parallel walls, a structure or series of structures movably supported between said walls, a series of wedges constructed to act between said structure or structures and one of the walls, with means for forcing said wedges through the machine to simultaneously compress a plurality of ingots confined between the movable structure or structures and the second of the walls, substantially as described.

5. An ingot press consisting of an elongated frame having substantially parallel walls and means for simultaneously compressing a plurality of ingots supported between said walls, said means including a plurality of pieces of progressively increasing widths, and a device for forcing said pieces through the press, substantially as described.

6. An ingot press consisting of an elongated frame having substantially parallel walls, wedges for the press, and means for forcing said wedges through the press to compress ingots placed between the walls, with a device for automatically feeding wedges to said means, substantially as described.

7. An ingot press consisting of an elongated frame having substantially parallel walls, wedges for the press, and means for forcing said wedges through the press to compress ingots placed between the walls, with a series of parallel-sided structures for forcing the wedges out of the press, substantially as described.

8. An ingot press consisting of an elongated frame having substantially parallel walls, wedges for the press, and means for forcing said wedges through the press to compress ingots placed between the walls, with a series of structures of less width than the wedges for forcing the wedges out of the press, substantially as described.

9. An ingot press consisting of an elongated frame having substantially parallel walls, wedges for the press, means for forcing said wedges through the machine to compress ingots therein, and means for reducing the friction between the wedges and the surfaces engaged thereby, substantially as described.

10. The combination in an ingot press of an elongated frame having substantially parallel walls, a series of blocks movably supported between the walls, wedges constructed to fit between said blocks and one of the walls, means for forcing said wedges through the machine to compress a series of ingots supported between the walls, and anti-friction rollers interposed between the wedges and the surfaces engaged thereby, substantially as described.

11. The combination in an ingot press of an elongated frame having substantially parallel walls, a series of blocks movably supported between the walls, wedges constructed to fit between said blocks and one of the walls, means for forcing said wedges through the machine to compress a series of ingots supported between the walls, a pair of endless conveyers, and anti-friction rollers thereon placed to be engaged by the wedges as they are forced through the machine, substantially as described.

12. An ingot press consisting of an elongated frame having two substantially parallel walls, transverse structures connecting said walls, a series of blocks movably supported on said structures, means for moving said blocks toward one of the walls to simultaneously compress a series of ingots, and other means for moving said blocks away from said wall to release said ingots, substantially as described.

13. An ingot press consisting of an elongated frame having substantially parallel walls, a series of blocks movably supported between said walls, means for exerting force in a line substantially parallel to the lines of the walls to move said blocks toward one of the walls and simultaneously compress a series of ingots, with other means for moving said blocks away from said walls to release said ingots, substantially as described.

14. An ingot press consisting of an elongated frame having substantially parallel walls and including structures extending transversely between said walls for holding the same together, two series of blocks supported upon said structures, means for conveying a plurality of ingots to a position between the two series of blocks, means for moving one series of the blocks to compress the ingots, and other means for moving said series of blocks to release the ingots, substantially as described.

15. An ingot press consisting of an elongated frame having two substantially parallel walls, two series of blocks supported between said walls, means for conveying a plurality of ingots to a position between said series of blocks, means for moving one series of the blocks to compress the ingots, and other means for moving said series of blocks to release the ingots, substantially as described.

16. An ingot press consisting of an elongated frame having substantially parallel walls, means for supporting a line of ingots between said walls, means for simultaneously applying a compressive force to those faces of said ingots parallel to said walls, and means independent of the compression means for preventing increase of the dimensions of the ingots in lines at right angles to the line of compression, substantially as described.

17. An ingot press consisting of a device for exerting pressure simultaneously upon a series of ingots in lines substantially perpendicular to two faces thereof, said device including a frame having a portion movable towards and from the series of ingots in a line at right angles to the line of said series, and removable frames for confining the ingots from more than a predetermined amount of change in dimensions in directions at right angles to the lines of action of the pressure, substantially as described.

18. The combination of ingot conveying means consisting of a plurality of cars, each constructed to support a plurality of ingots, with a press acting in lines at right angles to the line of cars for simultaneously compressing the ingots thereon, and confining frames for the ingots independent of the press structures, substantially as described.

19. The combination of ingot conveying means, means for simultaneously compressing a plurality of ingots to reduce the thickness thereof, and a device structurally independent of the compression means for confining a plurality of ingots to prevent increase in the width thereof, substantially as described.

20. An ingot press consisting of an elongated frame having substantially parallel walls, a series of wedges for the press, means for forcing said wedges through the press to compress ingots placed between the walls, and a device for automatically feeding the wedges to said forcing device, substantially as described.

21. An ingot press consisting of an elongated frame having substantially parallel walls, structures extending transversely between said walls, a series of blocks hung from said structures so as to be movable toward or from the walls, a system of weights for automatically moving the blocks of the series toward one of the walls to release ingots confined between them and the other walls, with a series of wedges, and means for forcing the wedges longitudinally through the machine between one of the walls and the movable series of blocks, substantially as described.

22. The combination of an ingot press having substantially parallel walls, means for mechanically connecting the same, a series of blocks movably supported between the walls, an endless conveyer, a series of anti-friction rollers supported by the conveyer and extending over one face of the blocks, a second endless conveyer having a portion extending upon the face of one of the walls, and a series of pieces of progressively increasing thickness shaped to be forced between said latter wall and the series of blocks in engagement with the two sets of anti-friction rollers, with means for supporting a plurality of ingots between the other walls of the press and the series of movable blocks, substantially as described.

23. An ingot press consisting of an elongated frame having substantially parallel walls, means for compressing a series of ingots supported between the walls, and frames for confining the ingots during compression, said frames having members for engaging those faces of the ingots lying in planes substantially parallel to the lines of pressure on the ingots and being provided with a top piece connecting said members, substantially as described.

24. An ingot press consisting of two substantially parallel walls, transverse structures connecting said walls, a track extending between the walls, ingot carrying cars therefor, frames for confining ingots on those faces perpendicular to the lines of motion of the ingots passing through the press, two series of blocks hung from the transverse structures of the frame, one series being between the ingots and one of the walls, and the second series of blocks being movable between the ingots and the other of the walls, a series of pieces of progressively increasing width placed to be forced between the latter series of blocks and the second of the walls, and means for forcing the pieces through the machine, substantially as described.

25. An ingot press consisting of an elongated frame having fixed side walls, a series of wedges for compressing ingots placed between the walls, a device for periodically forcing a wedge into the machine and thereby moving other wedges within the machine, a movable platform, and means for periodically actuating said platform to feed the wedges to said device, substantially as described.

26. An ingot press consisting of an elongated frame having fixed side walls, a series of wedges for compressing ingots confined between said walls, a movable structure placed to deliver the wedges successively to the press, a fluid operated device for forcing the wedges into and through the machine, and means for automatically controlling said device and the wedge supporting structure, substantially as described.

27. An ingot press having a frame including two substantially parallel fixed structures, a movable structure between said fixed structures, a series of pieces of progressively increasing thickness, means for forcing said pieces through the machine between the movable structure and one of the fixed structures, and frames for confining certain faces of the ingots not subjected to pressure, substantially as described.

28. An ingot press having a frame including two substantially parallel fixed structures, a movable structure between said fixed structures, and means acting in a line parallel to the lines of said structures for forcing the movable structure in a direction at right angles to said line toward one of the fixed structures to compress a series of ingots supported between said two structures, substantially as described.

29. The combination in an ingot press of two substantially parallel elongated structures, of which one is movable relatively to the other, and means acting in lines substantially parallel to the lines of said structures for forcing them together to simultaneously compress a plurality of ingots supported between them, substantially as described.

30. The combination in an ingot press of two substantially parallel elongated structures, of which one is movable relatively to the other, means for forcing together said structures to simultaneously compress a plurality of ingots between and in a line parallel with them, and means, independent of the structures, for confining the ingots from increasing their dimensions in a direction at right angles to the direction of the pressure applied to them, substantially as described.

In testimony whereof, I have signed my name to this specification, in the presence of two subscribing witnesses.

NILS H. O. LILIENBERG.

Witnesses:
MURRAY C. BOYER,
JOS. H. KLEIN.